United States Patent
Thompson (10) Patent No.: US 11,761,858 B2
(45) Date of Patent: Sep. 19, 2023

(54) HIERARCHICAL DATA STRUCTURE AND METHOD FOR PREDICTION OF TIRE WEAR

(71) Applicant: Bridgestone Americas Tire Operations, LLC, Nashville, TN (US)

(72) Inventor: Maxfield H. Thompson, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/026,729

(22) PCT Filed: Sep. 16, 2021

(86) PCT No.: PCT/US2021/050568
§ 371 (c)(1),
(2) Date: Mar. 16, 2023

(87) PCT Pub. No.: WO2022/072144
PCT Pub. Date: Apr. 7, 2022

(65) Prior Publication Data
US 2023/0258535 A1    Aug. 17, 2023

Related U.S. Application Data (60) Provisional application No. 63/085,212, filed on Sep. 30, 2020.

(51) Int. Cl.
| | | |
|---|---|---|
| G01M 17/02 | (2006.01) | |
| B60C 11/24 | (2006.01) | |
| G01B 11/22 | (2006.01) | |

(52) U.S. Cl.
CPC ......... *G01M 17/027* (2013.01); *B60C 11/246* (2013.01); *G01B 11/22* (2013.01)

(58) Field of Classification Search
None
See application file for complete search history.

(56) References Cited

U.S. PATENT DOCUMENTS

| | | |
|---|---|---|
| 7,792,774 B2 | 9/2010 | Friedlander et al. |
| 8,112,318 B2 | 2/2012 | Kirian et al. |

(Continued)

FOREIGN PATENT DOCUMENTS

| | | |
|---|---|---|
| CN | 108171820 A | 6/2018 |
| JP | 2019011048 A | 1/2019 |
| KR | 102079862 B1 | 2/2020 |

OTHER PUBLICATIONS

The International Search Report and the Written Opinion of the International Searching Authority for application No. PCT/US2021/050568, dated Dec. 20, 2021, 9 pages.

*Primary Examiner* — Harshad R Patel
*Assistant Examiner* — Gedeon M Kidanu (57) ABSTRACT

A computer-implemented method enables vehicle tire wear prediction based on minimal input data points. Information is aggregated in a hierarchical data structure regarding historical tread values for multiple tires, and respective values associated with the historical tread values for each of multiple parameters that are hierarchically defined from highest to lowest levels. A current tire tread value is provided from a sensor associated with a first tire, and respective values associated with the current tire tread value are provided for each of the multiple hierarchically defined parameters. The current tire tread value is matched with information from the hierarchical data structure corresponding to matching values for one or more of the hierarchically defined parameters having at least a predetermined threshold number of available tread values, and a tire wear rate is predicted for the first tire based at least in part on the matched information from the hierarchical data structure.

20 Claims, 6 Drawing Sheets

(56) References Cited

U.S. PATENT DOCUMENTS

| | | |
|---|---|---|
| 8,380,580 B2 | 2/2013 | Kirian et al. |
| 2002/0107873 A1 | 8/2002 | Winkler et al. |
| 2012/0191495 A1 | 7/2012 | Mcintosh et al. |
| 2018/0068355 A1 | 3/2018 | Garry et al. |
| 2018/0201077 A1 | 7/2018 | Xie et al. |
| 2018/0253109 A1 | 9/2018 | Fontaine et al. |
| 2018/0272813 A1 | 9/2018 | Singh et al. |
| 2019/0213667 A1 | 7/2019 | Gile et al. |
| 2020/0001662 A1 | 1/2020 | Storti et al. |

HIERARCHICAL DATA STRUCTURE AND METHOD FOR PREDICTION OF TIRE WEAR

FIELD OF THE DISCLOSURE

The present disclosure relates generally to tire wear prediction and monitoring systems for wheeled vehicles.

More particularly, systems, methods, and related algorithms as disclosed herein may use hierarchical data structures and inferential statistical methods for, e.g., fleet management, cost forecasting, and improved prediction of wear for tires of wheeled vehicles including but not limited to motorcycles, consumer vehicles (e.g., passenger and light truck), commercial and off-road (OTR) vehicles.

BACKGROUND

Prediction of tire wear is an important tool for anyone owning or operating vehicles, particularly in the context of fleet management. As tires are used, it is normal for the tread to gradually become shallower and overall tire performance to change. At a certain point it becomes critical to be aware of the tire conditions, as insufficient tire tread can create unsafe driving conditions. For example, when road conditions are non-optimal the tires may be unable to grip the road and a driver may lose control of his or her vehicle. Generally stated, the shallower the tire tread, the more easily the driver may lose traction when driving in rain, snow, or the like.

In addition, irregular tread wear may occur for a variety of reasons that may lead users to replace a tire sooner than would otherwise have been necessary. Vehicles, drivers, and individual tires are all different from each other, and can cause tires to wear at very different rates. For instance, high performance tires for sports cars wear more quickly than touring tires for a family sedan. However, a wide variety of factors can cause a tire to wear out sooner than expected, and/or cause it to wear irregularly and create noise or vibration. Two common causes of premature and/or irregular tire wear are improper inflation pressure and out-of-spec alignment conditions.

The estimation and/or prediction of tire wear over time may typically require knowledge of which tires are mounted in which wheel position for a given vehicle. However, most fleet management systems fail to sufficiently track or otherwise document such information. This creates difficulties for a number of important fleet management tasks, such as for example the generation of maintenance alerts, predicting the amount of wear life remaining, forecasting which (and when) tires will need to be replaced, cost projections, etc.

Another issue is the length of time that is conventionally required to obtain meaningful wear information for a given tire. As one example in the context of tire observation for waste vehicles, using a classic linear regression model created at a tire level, it was determined that six to eight weeks of weekly tread depth measurements would be required for reliable prediction of when a tire will be worn out. This amount of time depends on how fast the tread wears out on a tire, and therefore the expected window of time for monitoring tires in other business segments may be longer, as tires for other commercial tires may typically wear at a slower rate. These temporal limitations in conventional methods for monitoring tread depth change are not ideal for wear prediction models.

BRIEF SUMMARY

A hierarchical modeling approach as disclosed herein may accurately and reliably enable tire wear prediction with less data points. Exemplary such methods may rely on populating distributions from meta data collected with periodic wear inspections, such as e.g., wear information about a vehicle type, a vehicle type's axle, a specific vehicle, and a specific vehicle's axle, all to better inform prediction about a specific tire's wear rate. Fleet-level information and vehicle-level information may be understood as populating faster than at the tire level. Furthermore, each measurement taken at the tire level influences the inference made using these different wear distributions.

Generally stated, a wear model as disclosed herein may enable the use of predicted wear rates to track performance of vehicles, specific tires, routes, drivers, and the like. Using the wear rate, a fleet manger can know which trucks/driver/routes/tire models are burning through tread the fastest, or conversely, saving tread. Furthermore, accurate wear modeling helps a fleet plan tire purchasing. Wear-out prediction can for example be aggregated into a projected 'tire purchase estimation' for a given time period (e.g., year, month, week).

An exemplary embodiment of a computer-implemented method as disclosed herein for vehicle tire wear prediction may comprise aggregating information in a hierarchical data structure regarding historical tread values for a plurality of tires, and respective values associated with the historical tread values for each of a plurality of parameters that are hierarchically defined from a highest level to a lowest level. A current tire tread value may be provided from a sensor associated with a first tire, and respective values associated with the current tire tread value for each of the plurality of hierarchically defined parameters may be further provided, for example via a local computing device and/or associated user interface. The current tire tread value may be matched with information from the hierarchical data structure corresponding to matching values for one or more of the plurality of hierarchically defined parameters having at least a predetermined threshold number of available tread values, wherein a tire wear rate is predicted for the first tire based at least in part on the matched information from the hierarchical data structure.

In an exemplary aspect of the aforementioned embodiment, the tire wear rate for the first tire may be predicted based at least in part on the matched information corresponding to a highest hierarchically defined parameter having at least the predetermined threshold number of available tread values.

In another exemplary aspect of the aforementioned embodiment, the matched information from the highest hierarchically defined parameter may comprise a distribution of available tread values across a plurality of zones, and the tire wear rate for the first tire may be predicted by matching the current tire tread value with a subset of the distribution of tread values, and estimating future tire wear based on further historical information associated with the matched subset.

In another exemplary aspect of the aforementioned embodiment, tread values corresponding to the matched values for one or more of the plurality of hierarchically defined parameters may be filtered out if said filtered tread values exceed a predetermined boundary, wherein the number of unfiltered tread values is compared to the predetermined threshold number of available tread values.

In another exemplary aspect of the aforementioned embodiment, the plurality of parameters may be selected based on relevance to tire wear state prediction.

In another exemplary aspect of the aforementioned embodiment, the plurality of parameters may be hierarchically defined from a highest level to a lowest level based on fastest rates of population of the corresponding information to slowest rates of population of the corresponding information, respectively.

For example, the highest level of the hierarchically defined parameters may be a vehicle fleet location, wherein the lowest level of the hierarchically defined parameters may be a particular wheel location for a particular vehicle, and intervening levels between the highest level and the lowest level of the hierarchically defined parameters may include one or more of a vehicle type, a vehicle axle type, and the particular vehicle.

In another exemplary aspect of the aforementioned embodiment, a replacement time for the first tire may be predicted, based on the predicted tire wear status, as compared with one or more tire wear thresholds associated with the first tire.

In another exemplary aspect of the aforementioned embodiment, the one or more tire wear thresholds may comprise a tire tread threshold corresponding to a given wheel position associated with the first tire.

In another exemplary aspect of the aforementioned embodiment, a vehicle maintenance alert comprising the predicted replacement time and an identifier for the first tire may be generated and a message comprising the vehicle maintenance alert transmitted to a fleet management device.

An embodiment of a system for vehicle tire wear prediction may comprise a data storage network having a hierarchical data structure stored thereon, said hierarchical data structure aggregating information regarding historical tread values for a plurality of tires, and respective values associated with the historical tread values for each of a plurality of parameters that are hierarchically defined from a highest level to a lowest level. A sensor may be configured to provide a current tire tread value for at least a first tire, and at least one computing device is linked to the sensor and configured to further provide respective values associated with the current tire tread value for each of the plurality of hierarchically defined parameters. A server-based computing network is configured to match the current tire tread value with information from the hierarchical data structure corresponding to matching values for one or more of the plurality of hierarchically defined parameters having at least a predetermined threshold number of available tread values, and predict a tire wear rate for the first tire based at least in part on the matched information from the hierarchical data structure.

The server-based computing network may likewise be configured to execute or otherwise direct the performance of various among the exemplary aspect discussed above with respect to the aforementioned method.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Referring generally to FIGS. 1-5B, various exemplary embodiments of an invention may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual users and/or vehicles) for effectively implementing wear models as disclosed herein.

Figure 1:
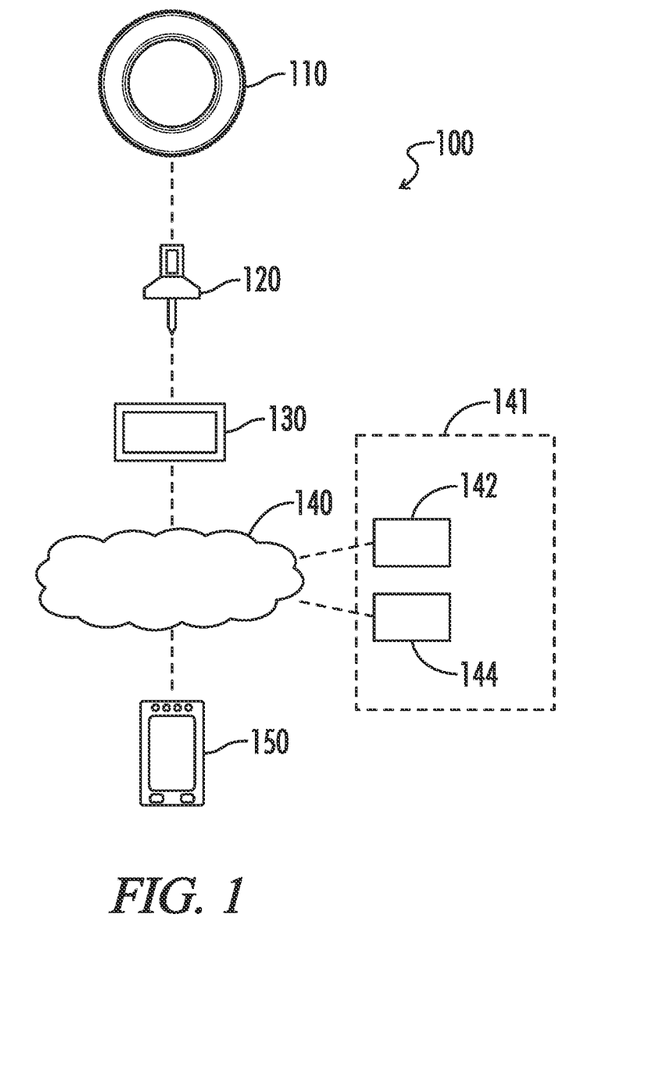
FIG. 1 is a block diagram representing an embodiment of a system for tire wear estimation as disclosed herein.

Referring initially to FIG. 1, an exemplary embodiment of the system 100 includes a tire tread depth sensor 120 configured to measure the tread depth for tires 110 that are targets for the wear models as disclosed herein. The tire tread depth sensor 120 in various embodiments may be analog in nature, or may be a digital tread depth gauge, or may be configured to scan the tire 110 and calculate a tread depth using laser, optical, imaging, or other equivalent sensing technologies as are known to those of skill in the art. The tire tread depth sensor 120 may be manually implemented, or it may be tire-mounted (e.g., mounted directly in the tire tread) or otherwise stationary and external to the tire. As one example, the tire tread depth sensor 120 may include a drive-over optical sensor comprising a laser emitter configured to capture tire tread information by projecting laser light onto or across a surface of the tire 110 passing over the sensor 120, and one or more laser receiving elements configured to capture reflected energy and thereby acquire a profile of the tire from which the tire tread may be determined.

A user can obtain the tread depth from the tire tread depth sensor 120 and manually enter the information via a user interface 130 on a local computing device, which may for example be mobile or otherwise mounted onboard a vehicle, and configured to at least obtain data and transmit said data via a communications network to a remote server 140 and/or perform relevant computations as disclosed herein. The tread depth sensor 120 may be configured to automatically transmit the tread depth information for a given tire 110 to the user interface 130, wherein the user for example can supplement the tread depth information with other information associated with the tire 110, or may confirm data which is populated in the user interface 130 by the system 100 and alongside the received tread depth information.

The server 140 may in an embodiment be referred to as a hosted server network, for example a private cloud server network and associated computing, storage, and interface tools as would be understood by one of skill in the art. The server-based functionality as disclosed herein may accordingly be implemented via one or more physical and/or virtual servers in a networked arrangement. However, in certain embodiments the functionality described herein with respect to the server may be distributed among one or more physical and/or virtual servers in a hosted network and further for example among resident program applications executed from local computing devices 130. The server 140 is in functional communication with a data storage network such that information may be selectively transmitted, stored, and retrieved for implementation of methods as disclosed herein. For example, a hierarchical data model 142 as disclosed herein may be stored in a database or equivalent in the data storage network. Fleet data 144 may also be stored in a database or equivalent in the data storage network, such data including for example any information associated with the relevant vehicles or tires in a fleet that are outside the scope of the meta information stored in the hierarchical data model 142 but may be desirable for users of the fleet management system or otherwise implemented by the system 100 for, e.g., establishing or confirming relationships between the nodes in the hierarchical data model.

A "data storage network" as used herein may refer generally to individual, centralized, or distributed logical and/or physical entities configured to store data and enable selective retrieval of data therefrom, and may include for example but without limitation a memory, look-up tables, files, registers, databases, and the like.

The models may be implemented at least in part via execution of a processor, enabling selective retrieval of, e.g., vehicle data and/or tire data and further in electronic communication for the input of any additional data or algorithms from a database, lookup table, or the like that is stored in association with the server.

The system may include additional distributed program logic such as for example residing on a fleet management server or other user computing device 150, or a user interface of a device resident to the vehicle or associated with a driver thereof (not shown) for real-time notifications (e.g., via a visual and/or audio indicator), with the fleet management device in some embodiments being functionally linked to the onboard device via a communications network. System programming information may for example be provided on-board by the driver or from a fleet manager. In certain embodiments the fleet management server or other user computing device 150 may be the same as the local computing device 130.

Figure 3:
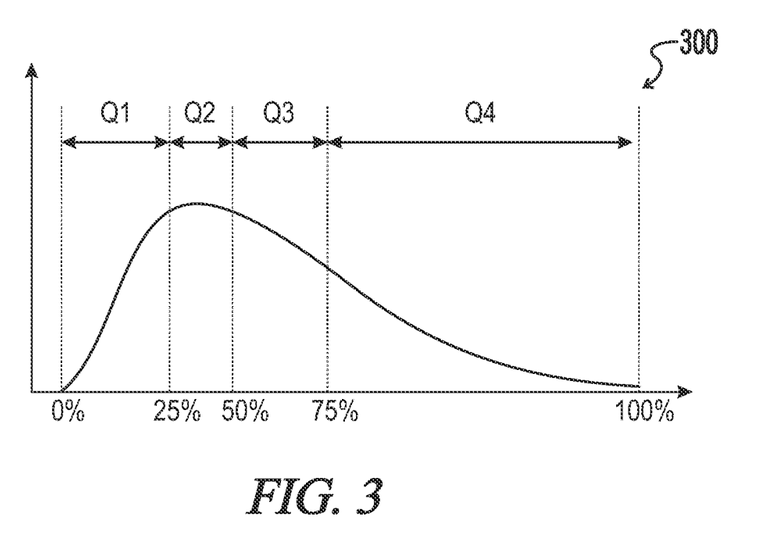
FIG. 3 is a graphical diagram representing an exemplary node in the tree diagram of FIG. 2, including an aggregation of tire tread wear measurements with accompanying summary statistics persisted through data storage.
Figure 4:
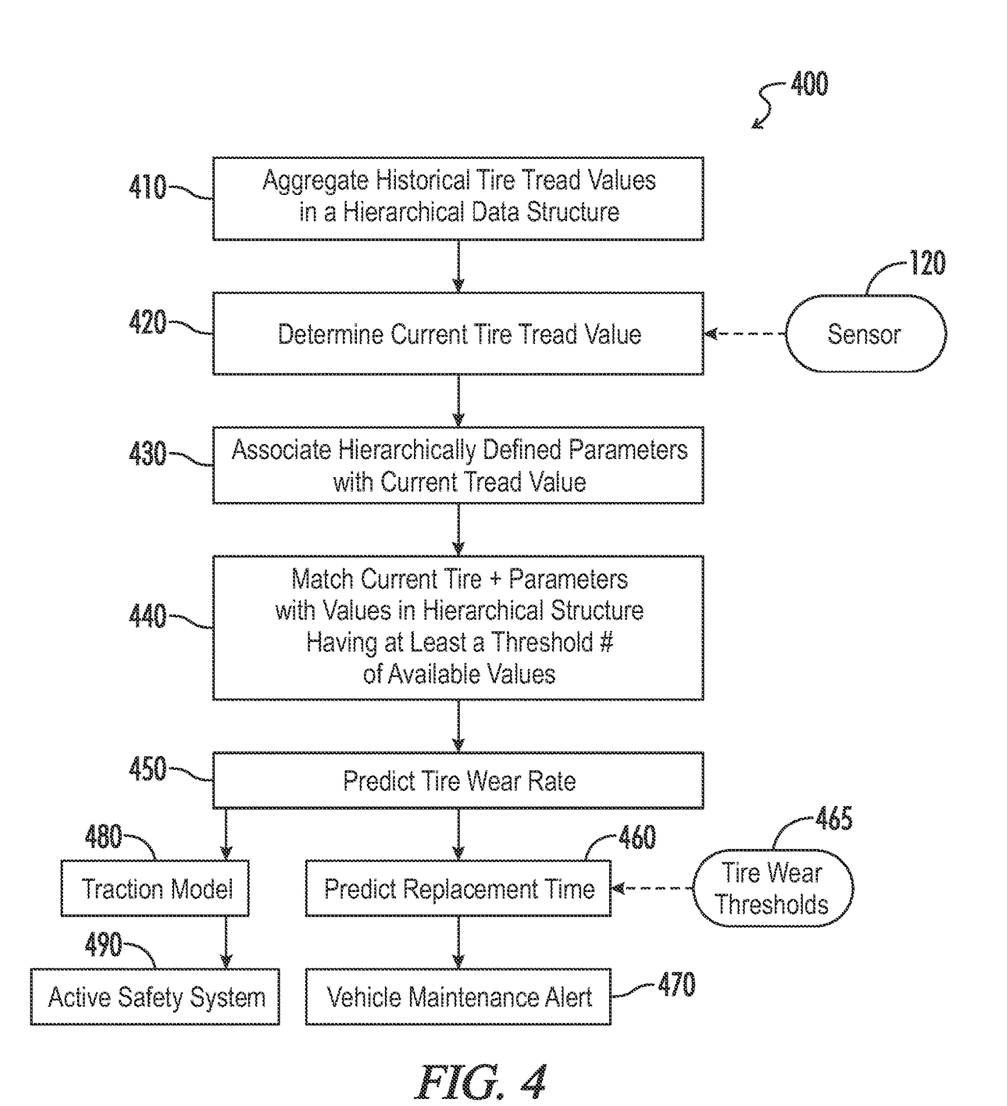
FIG. 4 is a flowchart representing an exemplary embodiment of a method as disclosed herein.

Referring next to FIG. 4, an exemplary method 400 of tire wear estimation based on a hierarchical distribution model (as further illustrated in FIGS. 2 and 3) may now be described. A system as illustrated in FIG. 1 may be implemented, or alternative embodiments of a system may be implemented for these or equivalent methods within the scope of the present disclosure unless otherwise stated. Depending on the embodiment, certain acts, events, or functions of any of the algorithms described herein can be performed in a different sequence, can be added, merged, or left out altogether (e.g., not all described acts or events are necessary for the practice of the algorithm).

In an embodiment, the method 400 includes aggregating information in a hierarchical data structure regarding historical tread values for a plurality of tires, and respective values associated with the historical tread values for each of a plurality of parameters that are hierarchically defined from a highest level to a lowest level (step 410). A current tire tread value may be provided from a sensor 120 associated with a first tire 110 (step 420), and respective values associated with the current tire tread value for each of the plurality of hierarchically defined parameters may be further provided (step 430), for example via a local computing device and/or associated user interface 130. The current tire tread value may be matched with information from the hierarchical data structure corresponding to matching values for one or more of the plurality of hierarchically defined parameters having at least a predetermined threshold number of available tread values (step 440), wherein a tire wear rate is predicted for the first tire based at least in part on the matched information from the hierarchical data structure (step 450).

The tire wear rate for the first tire may for example be predicted based at least in part on the matched information corresponding to a highest hierarchically defined parameter having at least the predetermined threshold number of available tread values.

The matched information from the highest hierarchically defined parameter may comprise a distribution of available tread values across a plurality of zones, and the tire wear rate for the first tire may be predicted by matching the current tire tread value with a subset of the distribution of tread values, and estimating future tire wear based on further historical information associated with the matched subset.

Tread values corresponding to the matched values for one or more of the plurality of hierarchically defined parameters may be filtered out if the filtered tread values exceed a predetermined boundary, wherein the number of unfiltered tread values is compared to the predetermined threshold number of available tread values.

The plurality of parameters may be selected based on relevance to tire wear state prediction. The plurality of parameters may be hierarchically defined from a highest level to a lowest level based on fastest rates of population of the corresponding information to slowest rates of population of the corresponding information, respectively. For example, the highest level of the hierarchically defined parameters may be a vehicle fleet location, wherein the lowest level of the hierarchically defined parameters may be a particular wheel location for a particular vehicle, and intervening levels between the highest level and the lowest level of the hierarchically defined parameters may include one or more of a vehicle type, a vehicle axle type, and the particular vehicle.

Figure 5:
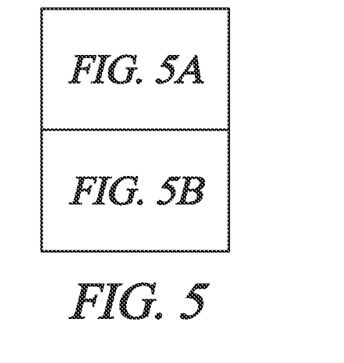
FIGS. 5A and 5B are portions of a collective flowchart representing an embodiment of a method as disclosed herein.
Figure 5A:
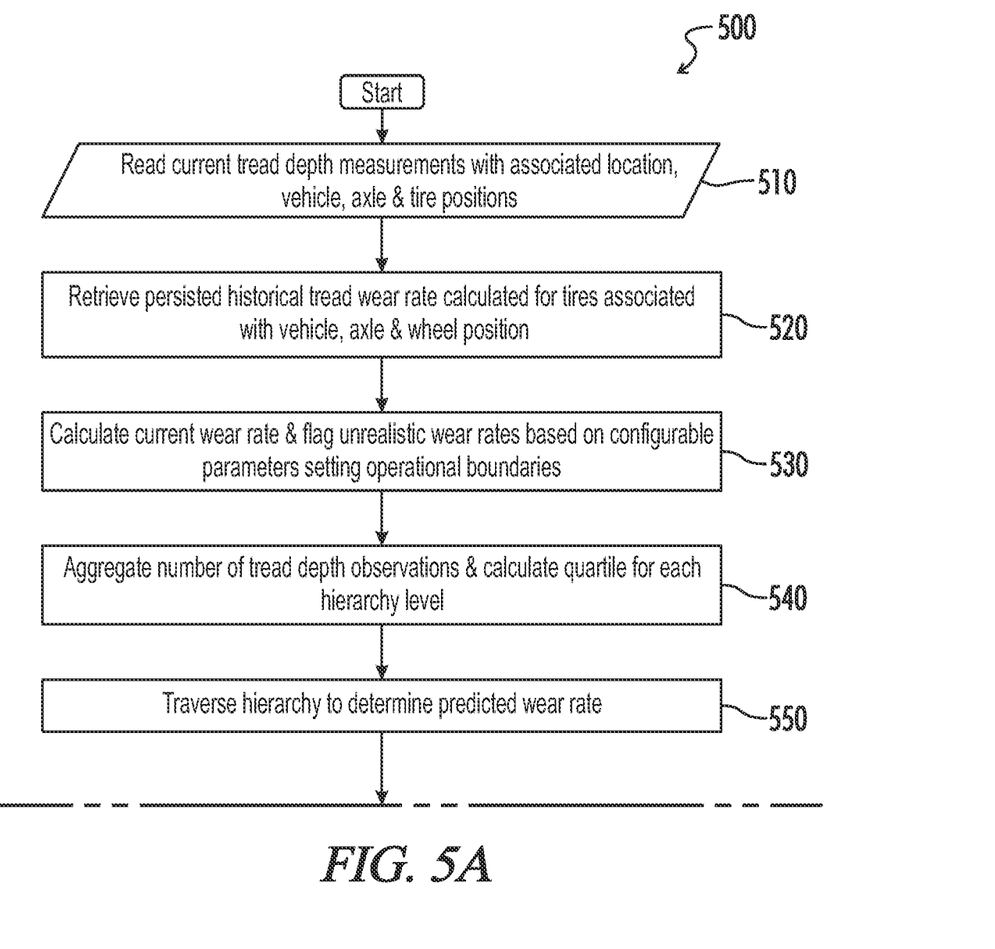
Figure 5B:
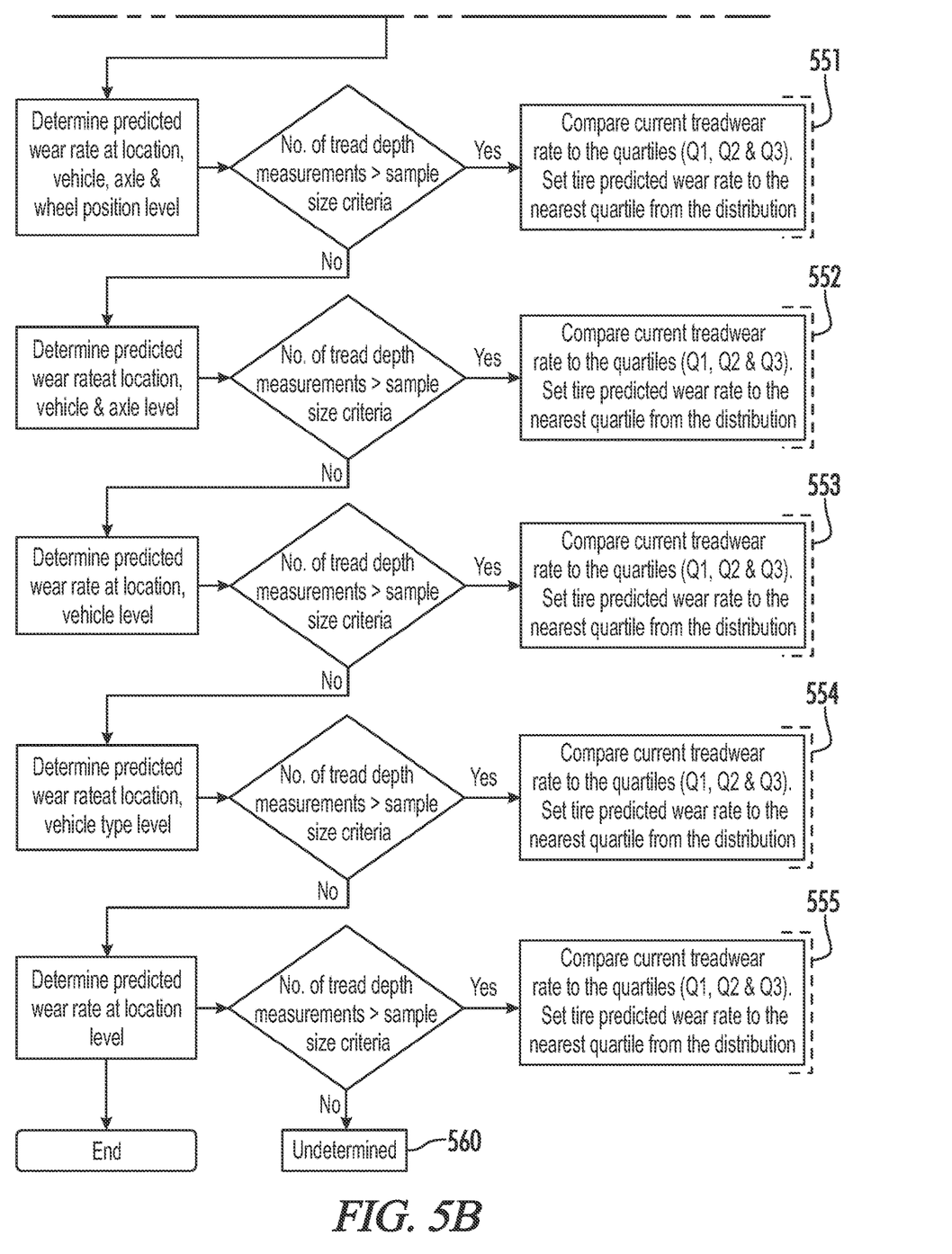

With reference now to FIGS. 5A and 5B, a method 500 as illustrated may provide further detail with respect to various embodiments of the method 400 associated with FIG. 4. The method 500 begins (in step 510) with a user collecting tread depth measurements of a tire with corresponding meta information about that tire (e.g., fleet location, wheel mount position on the vehicle, vehicle type, vehicle number, vehicle axle, etc.). The term "user" as used herein unless otherwise stated may refer to a driver, passenger, mechanic, technician, fleet management personnel, or any other person or entity as may be, e.g., associated with a device having a user interface for providing features and steps as disclosed herein. In an embodiment, the user may provide the meta information via respective data entry fields, pull-down menus, and the like in a user interface, but one of skill in the art may appreciate that various alternatives may be made available within the scope of the present disclosure. The tread depth measurements may for example be electronically captured and submitted, wherein a server or a hosted application responds with a user interface including the scanned tread depth measurement and prompts to enter the meta information, and/or pre-populated fields for confirmation of meta information previously associated with the tire (if any).

Distributions of wear rates may be populated at some or all of a plurality of meta data information levels that are determined to be relevant to tire wear rate estimation. Principal Component Analysis (PCA) may for example be implemented to determine which meta data levels are most relevant to wear rate, but one of skill in the art may contemplate alternative mechanisms for determining such levels in view of relevance to wear rate for a particular tire usage paradigm.

These meta data distributions may preferably be ordered from the highest to the lowest categorical levels, with these levels being determined based on, e.g., which wear rate distributions populate the fastest after taking inspections.

Figure 2:
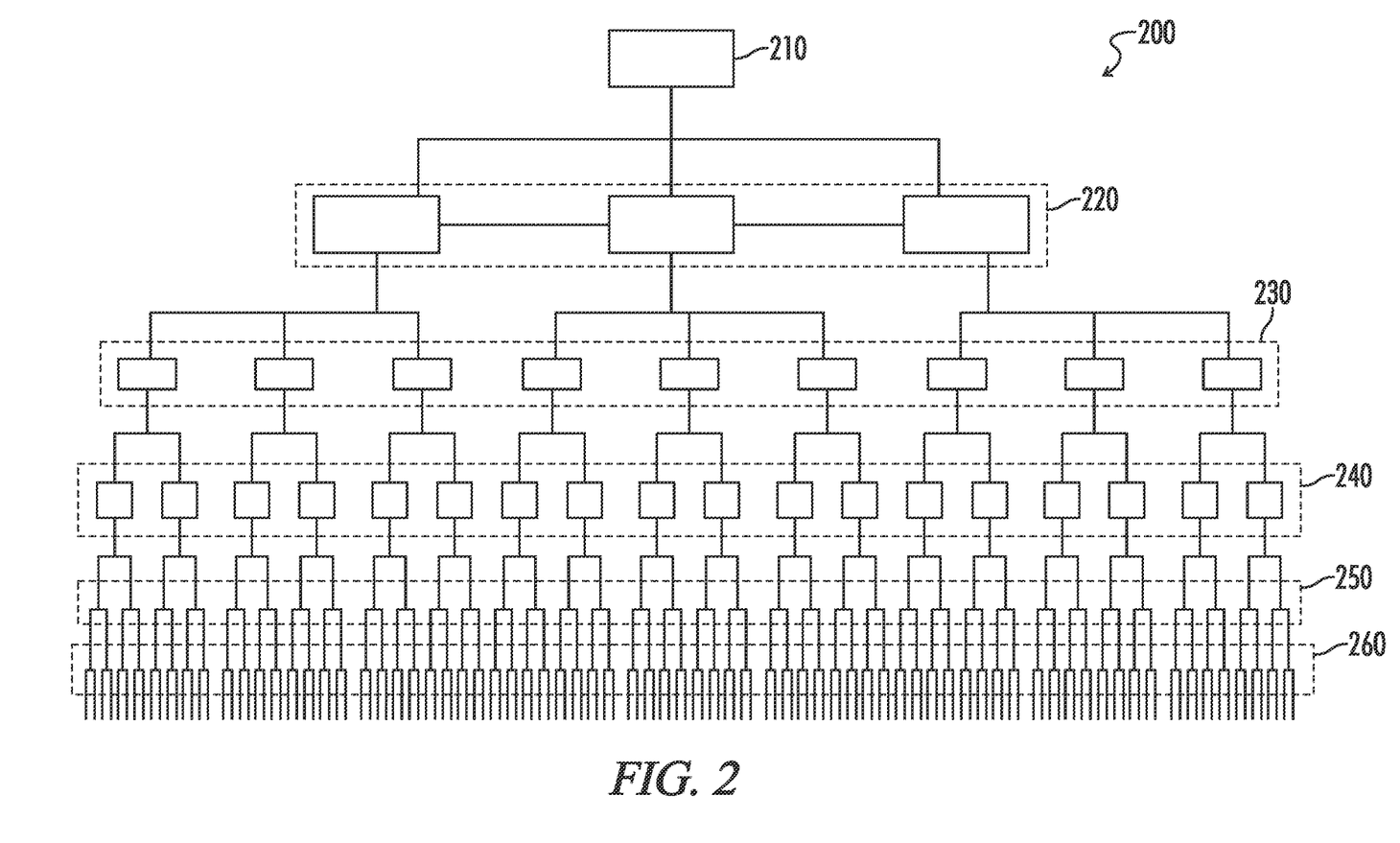
FIG. 2 is a graphical tree diagram representing an exemplary hierarchy of tire wear distributions moving from high variance to low variance distributions.

As represented in FIG. 2, a plurality of population-level tread wear distributions form an exemplary hierarchy 200 of tread wear distributions moving from high variance to lower variance units. The levels in the hierarchy 200 may include, e.g., fleet location 210, vehicle type 220, vehicle type axle 230, vehicle 240, vehicle axle 250, and in some embodiments may include individual tire/wheel location 260. These levels and their corresponding positions in the hierarchy 200 are not limiting on the scope of a system as disclosed herein unless otherwise specifically stated, and it may be understood that the selection of levels and their corresponding positions in a given hierarchical data model may be based on their determined relevance with respect to tire wear estimation algorithms being implemented, the variance of corresponding data inputs in a particular system or method, etc.

When a fleet location starts measuring tread depths, the distributions in the hierarchical model 200 may typically begin populating at the highest level (e.g., high variance categories such as the fleet location 210 and vehicle type 220), and more slowly start filling distributions at lower and lower levels (e.g., vehicle 240 and vehicle axle 250). This accordingly may create a massive tree diagram of distributions per fleet location, wherein every node in the tree may be an aggregation of tread wears with accompanying summary statistics persisted through the database 142. An exemplary node aggregation 300 with accompanying summary statistics are illustrated in FIG. 3, wherein a given distribution may include four quartiles (Q1, Q2, Q3, Q4) and a Median value, implemented in a manner as further discussed below.

Returning to FIG. 5, the method 500 further includes, upon reading current tread depth measurements for a given tire into the database(s), calculating/retrieving persisted historical tread wear rates associated with the relevant categories for the given tire, e.g., vehicle, axle, wheel position (step 520). The current wear rate for the given tire may be calculated, with each distribution potentially being filtered to remove 'unrealistic' wear rates, such as for example any positive wear change, or any wear rate that exceeds the bottom percentile of wear rates. For each corresponding level in the hierarchy 200, the number of tread depth observations may be aggregated and a quartile calculated for the given tire (step 530).

In an embodiment, each distribution may be assigned a minimum sample size which must be reached before the corresponding statistical information is used to inform the wear rate of a given tire (including the tire level). The hierarchies of distributions as disclosed herein may generally allow for reasonable tread wear inference to be calculated at any point in the life of the tire, even for example after a single measurement. However, individual tire tread wear measurements typically contain too much variance for the calculations to be reliable until, e.g., five or more suitable measurements are taken over a sufficient window of time. Accordingly, whenever a series of logical conditions are not met for a tire's tread wear measurements (e.g., a predetermined wear rate sample size has not been observed for a given hierarchical level, missing mileage, growing tread, etc.), the system may 'climb the hierarchy' to find a suitable wear rate for the given tire (step 550). Each level of the tree diagram (see, e.g., FIG. 2) may include additional logic that a distribution must meet before influencing the calculated current tread wear for the given tire. The distributions may not solely determine the tread wear, but may be implemented to influence the tread wear calculation with varying degrees of weight. The system may for example continuously analyze these distributions to determine or refine the reasonableness of its own calculations, such that the tire, vehicle axle, or vehicle may preferably never display a tread wear rate that is objectively unreasonable with respect to wear rates for a given fleet location or vehicle type.

Referring to the exemplary hierarchy 200 in FIG. 2, the system 'climbs' or proceeds to analyze the next most detailed information level above a current level. For example, the system may first look (step 551) to the wear distribution 250 for a specific vehicle axle. If the distribution at this level has previously received and aggregated enough tread depth measurements to, e.g., exceed a predetermined sample size criterion, the method proceeds to compare the current tread wear rate for the tire to the quartiles associated with the relevant node, and to further set the predicted tire wear rate to the nearest quartile from the distribution.

If the distribution for the specific vehicle axle 250 has not previously received and aggregated enough observations to create a reliable distribution, the system and method may proceed one level higher and analyzes the distribution 240 corresponding to the vehicle upon which the given tire is mounted at that current moment (step 552). As with the preceding step, if the distribution at this level has previously received and aggregated enough tread depth measurements to, e.g., exceed a predetermined sample size criterion, the method proceeds to compare the current tread wear rate for the tire to the quartiles associated with the relevant node, and to further set the predicted tire wear rate to the nearest quartile from the distribution.

With repeated failures to identify sufficient numbers of observations (or other criteria), the system continues to successively climb the hierarchy and considers the distributions for the axle 230 for that type of vehicle, that vehicle type 220, and then finally the fleet level distribution 210 (steps 553, 554, and 555).

As the system proceeds upwards along the hierarchy 200, the wear rate at that tire level inspection may be saved and used as a predictive indicator (sway) at the first appropriate hierarchy level that meets the sample size criteria. The 'sway' is created by matching the current wear rate for a given tire with the nearest quartile calculated on the distributions at the closest appropriate level. That quartile-matched wear rate, at the closest possible distribution to the tire in view of the associated logic and 'reasonableness' boundaries, is then used as the predicted wear rate for the tire.

One exemplary advantage to the methodology as disclosed herein, for example by reference to FIGS. 4 and 5, is that once a fleet has been observed for several months in consistent intervals, almost all of the distribution levels have been adequately populated. Each successive instance thereafter, when a new tire is placed in any given wheel position in a fleet, accurate wear information may be predicted about that tire by only taking, e.g., one or two tread measurements. This improvement drastically speeds up the time it takes to provide predicted wear out rates for a fleet inspection.

In various embodiments, for example by continued reference to FIG. 4, the method 400 may further involve predicting wear values at one or more future points in time, wherein such predicted values may be compared to respective threshold values 465. For example, a feedback signal corresponding to the predicted tire wear rate (e.g., predicted tread depth at a given distance, time, or the like) may be provided via an interface to an onboard device associated with the vehicle itself, or to a mobile device associated with a user, such as for example integrating with a user interface configured to provide alerts or notice/recommendations that a tire should or soon will need to be replaced (step 460). Other tire-related threshold events can be predicted and implemented for alerts and/or interventions within the scope of the present disclosure and based on predicted tire wear, including for example tire rotation, alignment, inflation, and the like. The system may generate such alerts and/or intervention recommendations based on individual thresholds, groups of thresholds, and/or non-threshold algorithmic comparisons with respect to predetermined parameters (step 470).

As another example, a hierarchical wear model as disclosed herein may enable fleet management systems to track performance of not only specific vehicles and tires, but associated routes, drivers, and the like. Using the predicted wear rates obtained via the methods herein, a fleet manger may for example ascertain which trucks, drivers, routes, and/or tire models are burning through tread the fastest, or conversely, saving tread. Furthermore, accurate wear modeling may preferably provide decision support with respect to fleet tire purchasing. Wear out prediction may for example be aggregated into a projected tire purchase estimation model for a given year, month, week, or the like.

As another example, an autonomous vehicle fleet may comprise numerous vehicles having varying minimum tread status values, wherein the fleet management system may be configured to proactively disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In an embodiment, a predicted tire wear for one or more future times, distances, or the like may be provided as an output from the model to one or more downstream models or applications (step 480). For example, a predicted tire wear status (e.g., tread depth at a given mileage) may be generated as feedback or feed-forward signals to a vehicular control system, a traction model (in the same system or as part of another system functionally linked thereto), and/or another predictive model associated with fuel efficiency, durability, or the like. The predicted tire wear (e.g., tread depth) may for example be provided along with certain vehicle data as inputs to the traction model, which may be configured to provide an estimated traction status or one or more traction characteristics for the respective tire. An exemplary traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed for example at the cloud server level.

In one embodiment, the outputs from this traction model may be incorporated into an active safety system, an autonomous fleet management system, or the like (step 490). As previously noted, data may be collected from sensors on the vehicle to feed into the tire wear model which will predict tread depth, and this data may further be fed into a traction model. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for vehicle tire wear prediction, the method comprising:
    aggregating information in a hierarchical data structure regarding historical tread values for a plurality of tires, and respective values associated with the historical tread values for each of a plurality of parameters that are hierarchically defined from a highest level to a lowest level;
    providing a current tire tread value from a sensor associated with a first tire, and respective values associated with the current tire tread value for each of the plurality of hierarchically defined parameters;
    matching the current tire tread value with information from the hierarchical data structure corresponding to matching values for one or more of the plurality of hierarchically defined parameters having at least a predetermined threshold number of available tread values; and
    predicting a tire wear rate for the first tire based at least in part on the matched information from the hierarchical data structure.

2. The computer-implemented method according to claim 1, further characterized in that the tire wear rate for the first tire is predicted based at least in part on the matched information corresponding to a highest hierarchically defined parameter having at least the predetermined threshold number of available tread values.

3. The computer-implemented method according to claim 2, further characterized in that:
    the matched information from the highest hierarchically defined parameter comprises a distribution of available tread values across a plurality of zones, and
    the tire wear rate for the first tire is predicted by
        matching the current tire tread value with a subset of the distribution of tread values, and
        estimating future tire wear based on further historical information associated with the matched subset.

4. The computer-implemented method according to claim 3, further comprising:
    filtering out tread values corresponding to the matched values for one or more of the plurality of hierarchically defined parameters if said filtered tread values exceed a predetermined boundary, and
    wherein the number of unfiltered tread values is compared to the predetermined threshold number of available tread values.

5. The computer-implemented method according to claim 3, further characterized in that the plurality of parameters are selected based on relevance to tire wear state prediction.

6. The computer-implemented method according to claim 3, further characterized in that the plurality of parameters are hierarchically defined from a highest level to a lowest level based on fastest rates of population of the corresponding information to slowest rates of population of the corresponding information, respectively.

7. The computer-implemented method according to claim 6, further characterized in that the highest level of the hierarchically defined parameters comprises a vehicle fleet location.

8. The computer-implemented method according to claim 7, further characterized in that the lowest level of the hierarchically defined parameters comprises a particular wheel location for a particular vehicle.

9. The computer-implemented method according to claim 8, further characterized in that one or more levels between the highest level and the lowest level of the hierarchically defined parameters include one or more of a vehicle type, a vehicle axle type, and the particular vehicle.

10. The computer-implemented method according to claim 6, further comprising:
    predicting a replacement time for the first tire, based on the predicted tire wear rate, as compared with one or more tire wear thresholds associated with the first tire.

11. The computer-implemented method according to claim 10, further characterized in that the one or more tire wear thresholds comprise a tire tread threshold corresponding to a given wheel position associated with the first tire.

12. The computer-implemented method according to claim 10, further comprising:
    generating a vehicle maintenance alert comprising the predicted replacement time and an identifier for the first tire; and
    transmitting a message comprising the vehicle maintenance alert to a fleet management device.

13. A system for vehicle tire wear prediction, comprising:
    a data storage network having a hierarchical data structure stored thereon, said hierarchical data structure aggregating information regarding historical tread values for a plurality of tires, and respective values associated with the historical tread values for each of a plurality of parameters that are hierarchically defined from a highest level to a lowest level;

a sensor configured to provide a current tire tread value for at least a first tire;

at least one computing device linked to the sensor and configured to further provide respective values associated with the current tire tread value for each of the plurality of hierarchically defined parameters; and a server-based computing network comprising computer readable media having instructions residing thereon and executable by one or more processors, the server network configured to match the current tire tread value with information from the hierarchical data structure corresponding to matching values for one or more of the plurality of hierarchically defined parameters having at least a predetermined threshold number of available tread values, and predict a tire wear rate for the first tire based at least in part on the matched information from the hierarchical data structure.

14. The system according to claim 13, further characterized in that the tire wear rate for the first tire is predicted based at least in part on the matched information corresponding to a highest hierarchically defined parameter having at least the predetermined threshold number of available tread values.

15. The system according to claim 14, further characterized in that:

the matched information from the highest hierarchically defined parameter comprises a distribution of available tread values across a plurality of zones, and the tire wear rate for the first tire is predicted by
matching the current tire tread value with a subset of the distribution of tread values, and
estimating future tire wear based on further historical information associated with the matched subset.

16. The system according to claim 15, further characterized in that the server-based computing network is further configured to:

filter out tread values corresponding to the matched values for one or more of the plurality of hierarchically defined parameters if said filtered tread values exceed a predetermined boundary, and compare the number of unfiltered tread values to the predetermined threshold number of available tread values.

17. The system according to claim 15, further characterized in that the plurality of parameters are selected based on relevance to tire wear state prediction.

18. The system according to claim 15, further characterized in that the plurality of parameters are hierarchically defined from a highest level to a lowest level based on fastest rates of population of the corresponding information to slowest rates of population of the corresponding information, respectively.

19. The system according to claim 18, further characterized in that:

the highest level of the hierarchically defined parameters comprises a vehicle fleet location, the lowest level of the hierarchically defined parameters comprises a particular wheel location for a particular vehicle, and one or more levels between the highest level and the lowest level of the hierarchically defined parameters include one or more of a vehicle type, a vehicle axle type, and the particular vehicle.

20. The system according to claim 18, further characterized in that the server-based computing network is further configured to:

predict a replacement time for the first tire, based on the predicted tire wear status, as compared with one or more tire wear thresholds associated with the first tire, wherein the one or more tire wear thresholds comprise a tire tread threshold corresponding to a given wheel position associated with the first tire, generate a vehicle maintenance alert comprising the predicted replacement time and an identifier for the first tire; and transmit a message comprising the vehicle maintenance alert to a fleet management device.

\* \* \* \* \*